M. A. KENDALL.
UNIFORMLY DISTRIBUTING TRIPPER.
APPLICATION FILED JULY 15, 1919.
1,375,704.
Patented Apr. 26, 1921.
2 SHEETS—SHEET 1.
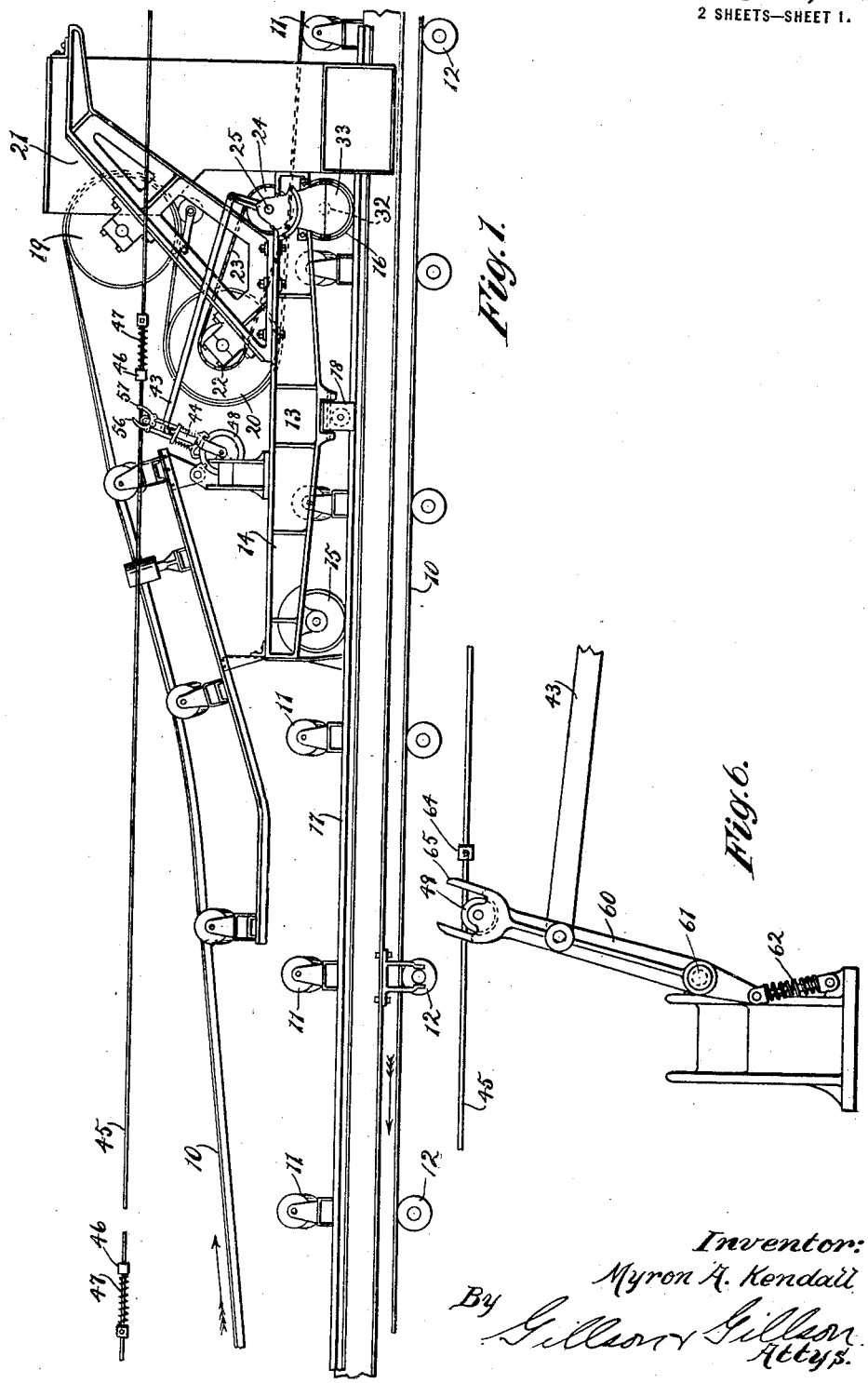
Inventor:
Myron A. Kendall
By Gillson & Gillson
Attys.

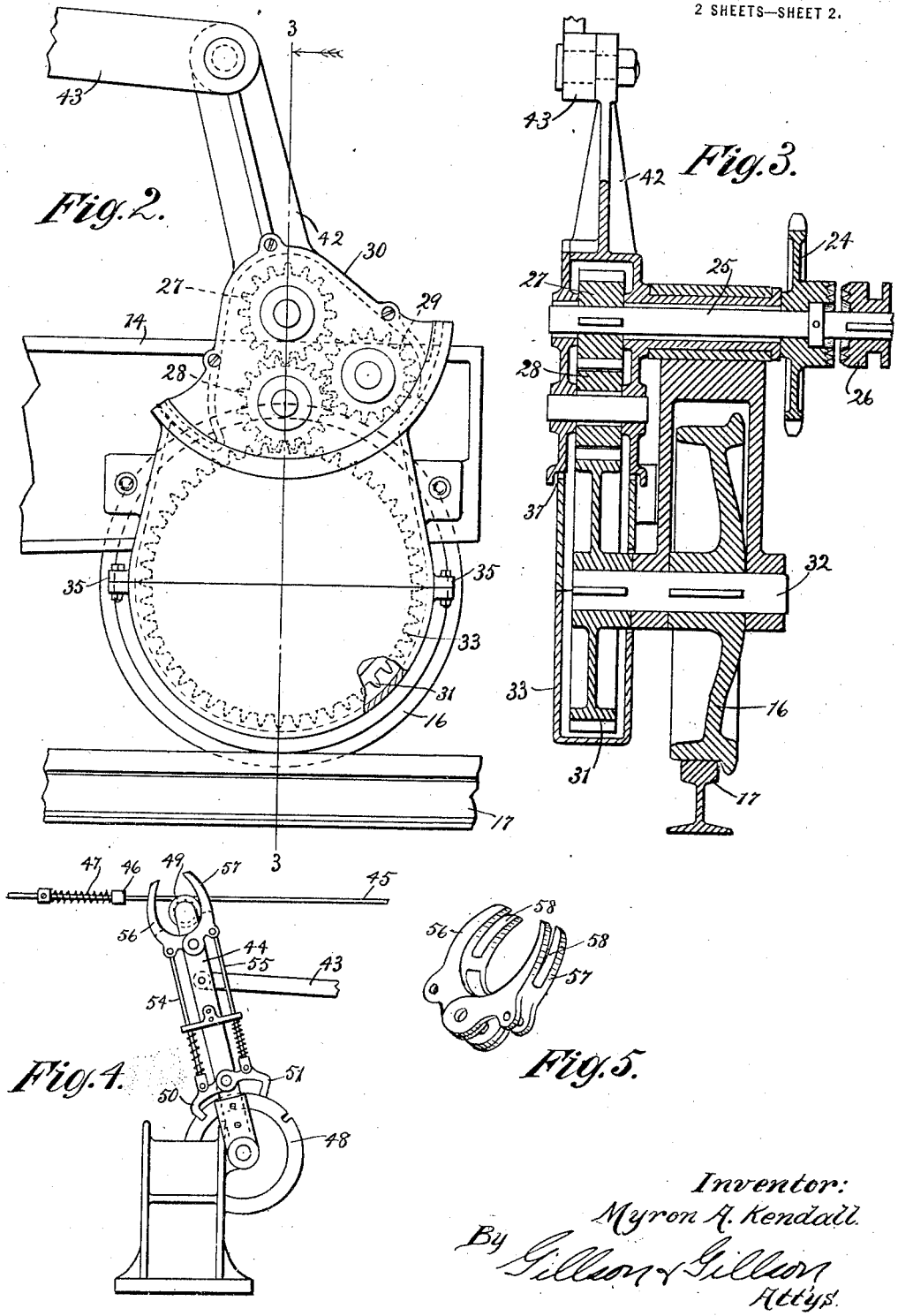

UNITED STATES PATENT OFFICE.

MYRON A. KENDALL, OF AURORA, ILLINOIS, ASSIGNOR TO STEPHENS-ADAMSON MFG. CO., OF AURORA, ILLINOIS, A CORPORATION OF ILLINOIS.

UNIFORMLY-DISTRIBUTING TRIPPER.

1,375,704.   Specification of Letters Patent.   Patented Apr. 26, 1921.

Application filed July 15, 1919. Serial No. 310,966.

*To all whom it may concern:*

Be it known that I, MYRON A. KENDALL, a citizen of the United States, and resident of Aurora, county of Kane, and State of Illinois, have invented certain new and useful Improvements in Uniformly-Distributing Trippers, of which the following is a specification, and which are illustrated in the accompanying drawings, forming a part thereof.

The invention relates to trippers for distributing belt conveyers and especially to so-called bedding trippers which travel back and forth between predetermined limits for the purpose of depositing the material delivered by the belt over a substantial distance, as upon a long pile or heap. The object of the invention is the provision of an improved machine of this type having truck wheels which are gear driven from the pulleys which guide the belt and is automatically reversible to effect the discharge of the material during the travel of the machine in both directions.

In the accompanying drawings:—

Figure 1 is a side elevation of a tripper, embodying one form of the invention, some of the adjacent parts of a belt conveyer being also shown in this view, Fig. 2 is a detail side elevation of the reversing mechanism, Fig. 3 is a vertical sectional view taken on the line 3—3 of Fig. 2;

Fig. 4 is a detail side elevation showing a different part of the reversing mechanism;

Fig. 5 is a perspective view of a pair of pawl lifting arms, and

Fig. 6 is a detail side elevation of a modified form of reversing mechanism.

The conveyer belt is represented at 10, the direction of its travel being indicated by arrows on Fig. 1. The rollers for supporting and troughing the loaded portion of the belt are shown at 11 and the rollers for supporting the return length of the belt at 12. The tripper is indicated generally at 13 but the present invention is concerned only with the propelling and reversing mechanism by which the desired travel of the tripper is accomplished. As shown, the tripper comprises a truck having a frame 14 and carrying wheels 15, 16, the latter running on track 17 which is of sufficient width to span the troughing rollers 11. As usual, an adjustable brake 18 is provided for preventing the tripper from being drawn along the track at belt speed when the propelling mechanism is not in operation.

The tripper also includes the usual pulleys 19, 20, which guide the conveyer belt through an S-shaped turn for the discharge of material into a hopper 21 from which it is spouted to one or both sides of the belt in a well known manner. Power for propelling the tripper along the track 17 is derived from the belt 10 through one of the guide pulleys, as 20. For this purpose a sprocket wheel 22 may be applied to the spindle of guide pulley 20 in which case a sprocket chain 23 turns over sprocket wheel 22 and over a second sprocket wheel 24 mounted on counter shaft 25. For the purpose of relieving the propelling elements of excessive strain at the instant of reversal the sprocket wheel 24 is preferably connected to counter shaft 25 by a friction clutch conventionally represented at 26.

In carrying out the present invention power is transmitted from counter shaft 25 to the axle, as 32, upon which the truck wheels, as 16, of one pair, are mounted. As shown, the axle 32 is extended at one end beyond the corresponding truck wheel 16 and the adjacent journal bearings and a gear 31 is applied to the said extended end of the axle. Similarly, counter shaft 25 is extended beyond the truck frame 14 and carries a driving pinion 27, power being transmitted from the pinion 27 to gear 31 through one or both of two intermediate gears 28, 29, for moving the tripper in the two directions. The intermediate gears 28 and 29 are carried by a swinging sector 30 which turns upon counter shaft 25 as a center and is preferably chambered to provide a closure within which pinion 27 and gears 28 and 29 are contained. To permit the engagement of gears 28 and 29 with gear 31 the chambered sector 30 is open at the bottom but gear 31 is inclosed by a stationary casing 33 which extends upwardly to and preferably makes a close fit with the lower end of the casing 30, as at 37, Fig. 3. When it is desired to drive the tripper in a direction opposite to the direction of travel of the conveyer belt 10, the gears are placed in mesh, as shown in Fig. 2. If, however, the sector 30 be swung to a position in which gear 29 meshes with gear 31, the tripper will be driven in the direction of travel of the belt or forward, since gear 29 is always in mesh with gear 28. Movement of the tripper back and forth on track 17 is accordingly accomplished by the provision of means for automatically swinging sector 30 when the end of the desired movement in each direction is reached.

As shown, sector 30 is formed with a crank arm 42 and this crank arm is connected by a link 43 with shipper lever 44 (Fig. 4) or 60 (Fig. 6). In the form of construction illustrated in Fig. 4, shipper lever 44 is held in either one of two positions by the engagement of one or the other of two spring pawls 50 and 51 with a notched segment 48. Each of the spring pawls 50 and 51 is connected with a lifting rod 54 or 55 and each of these lifting rods is in turn connected with an operating lever 56 or 57 similar in form to the devices commonly used as pawl lifters upon hand operated shipper levers, except that each of the said operating levers 56 and 57 is formed with a deep notch 58 at its upper end for receiving a cable 45 which is extended alongside the track 17, at substantially the level of the upper end of the shipper lever 44. If desired the shipper lever 44 (Fig. 4) or 60 (Fig. 6) may be provided with a trolley wheel 49 for engagement with the cable 45.

When the shipper lever 44 is used, the cable 45 is preferably equipped with yielding stops, as 46, each controlled by a spring as 47, one of said stops being located at each of the points selected for the reversal of the tripper. Upon contact of the operating levers 56 or 57 with the corresponding stop 46, the spring 47 behind the stop is first compressed and the lever 56 or 57 then moved to lift the corresponding pawl 50 or 51 when the compressed spring 47 is free to expand and throws the lever 44 to its other extreme position. This movement of lever 44 is communicated to the sector 30 through link 43 for withdrawing one of the gears 28, 29, from engagement with gear 31 and engaging the other gear therewith. Gears 28 and 29 are so disposed with reference to gear 31 that in the intermediate position of sector 30 neither one of gears 28, 29, is engaged with gear 31. However, the provision of spring 47 behind stop 46 serves to automatically effect a complete movement of sector 30 and one or the other of gears 28, 29 is always engaged with gear 31 unless the sector 30 is manually shifted to the intermediate position. To insure a smooth rolling movement of gears 28 and 29 into and out of engagement with gear 31 all of these gears are desirably formed with pointed teeth as most clearly shown in Fig. 2.

In the form of construction illustrated in Fig. 6, shipper lever 60 is extended below its pivot 61 and is yieldingly held in each of its extreme positions by a spring 62 which reacts between a fixed appurtenance of the truck 13 and the said lower end of the lever. During movement of lever 60 spring 62 passes the center line of its action and serves to complete the said movement. When this form of construction is used, cable 45 may be equipped with fixed stops, as 64. For engagement with the said stops 64 lever 60 is formed with a notched extension 65 at each side of the corresponding trolley wheel 49.

I claim as my invention:

1. In a tripper for belt conveyers, in combination, a wheeled truck, tripping belt pulleys mounted on the truck, a gear wheel mounted rigidly with one of the truck wheels, a countershaft, driving connection between one of the belt pulleys and such shaft, a gear wheel fixed on the shaft, a frame swinging about the shaft, a pair of intermeshing pinions carried by the frame, one thereof meshing with the gear fixed to the shaft, such pinions being so positioned that they may alternatively be brought into mesh with the gear wheel mounted with the truck, and means for swinging the frame.

2. In a tripper for belt conveyers, in combination, a wheeled truck, tripping belt pulleys mounted on the truck, a gear wheel mounted rigidly with one of the truck wheels, a countershaft, sprocket wheels fixed on the countershaft and on one of the pulley shafts, a chain connecting such sprocket wheels, a gear wheel fixed on the shaft, a frame swinging about the shaft, a pair of intermeshing pinions carried by the frame, one thereof meshing with the gear fixed to the shaft, such pinions being so positioned that they may alternatively be brought into mesh with the gear wheel mounted with the truck, and means for swinging the frame.

3. In a traveling tripper for belt conveyers, in combination, a wheeled truck, belt pulleys mounted thereon, and driving connection between one of such pulleys and the truck comprising a driving and a driven gear, and a frame oscillatable about the axis of one of such gears, a pair of intermeshing gears carried by the frame one thereof being constantly engaged by the gear about the axis of which the frame oscillates, the gears of such pair being alternatively engageable with the other of such gears, and means for swinging the frame.

MYRON A. KENDALL.